United States Patent
Kitaura et al.

(10) Patent No.: US 7,431,973 B2
(45) Date of Patent: Oct. 7, 2008

(54) OPTICAL INFORMATION RECORDING MEDIUM, AND MANUFACTURING METHOD, RECORDING METHOD, AND RECORDING APPARATUS THEREOF

(75) Inventors: Hideki Kitaura, Souraku-gun (JP); Noboru Yamada, Hirakata (JP); Rie Kojima, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 501 days.

(21) Appl. No.: 11/059,657

(22) Filed: Feb. 17, 2005

(65) Prior Publication Data
US 2005/0202203 A1 Sep. 15, 2005

(30) Foreign Application Priority Data
Mar. 12, 2004 (JP) .............. 2004-070413

(51) Int. Cl.
*B32B 3/02* (2006.01)
(52) U.S. Cl. ............ 428/64.1; 428/64.4; 428/64.5; 428/64.6; 430/270.13
(58) Field of Classification Search .......... 428/64.4, 428/64.5, 64.6; 430/270.13
See application file for complete search history.

(56) References Cited

U.S. PATENT DOCUMENTS

| | | | | |
|---|---|---|---|---|
| 5,733,623 A | * | 3/1998 | Raychaudhuri et al. | 428/64.1 |
| 5,948,496 A | * | 9/1999 | Kinoshita et al. | 428/64.1 |
| 6,245,404 B1 | | 6/2001 | Saito et al. | |
| 6,416,837 B1 | * | 7/2002 | Kojima et al. | 428/64.1 |
| 6,841,218 B2 | * | 1/2005 | Hosoda et al. | 428/64.1 |
| 6,982,111 B2 | * | 1/2006 | Mizushima et al. | 428/64.1 |
| 7,063,876 B2 | * | 6/2006 | Nishihara et al. | 428/64.1 |
| 2003/0138669 A1 | | 7/2003 | Kojima et al. | |
| 2004/0106065 A1 | * | 6/2004 | Miyamoto et al. | 430/270.13 |

FOREIGN PATENT DOCUMENTS

| | | |
|---|---|---|
| CN | 1227381 | 9/1999 |
| CN | 1424720 | 6/2003 |
| EP | 1 396 853 | 3/2004 |
| JP | 62-209741 | 9/1987 |
| JP | 64-79945 | 3/1989 |
| JP | 2000-215516 | 8/2000 |

OTHER PUBLICATIONS

Office Action dated Oct. 19, 2007 in Chinese Application No. 200510054758.4, which is a foreign counterpart of the present application.

* cited by examiner

*Primary Examiner*—Elizabeth Mulvaney
(74) *Attorney, Agent, or Firm*—Wenderoth, Lind & Ponack, L.L.P.

(57) ABSTRACT

A recording medium has at least a recording layer on a transparent substrate. The recording layer has at least a first phase-changeable film and a second phase-changeable film in that order, starting on the side closest to the transparent substrate. The first phase-changeable film and the second phase-changeable film each contains at least 10 atom % and no more than 50 atom % germanium and at least 45 atom % and no more than 60 atom % tellurium. Also at least one of the phase-changeable films contains bismuth.

14 Claims, 3 Drawing Sheets

OPTICAL INFORMATION RECORDING MEDIUM, AND MANUFACTURING METHOD, RECORDING METHOD, AND RECORDING APPARATUS THEREOF

CROSS-REFERENCE TO RELATED APPLICATIONS

This application claims priority to Japanese Patent Application No. 2004-070413. The entire disclosure of Japanese Patent Application No. 2004-070413 is hereby incorporated herein by reference.

BACKGROUND OF THE INVENTION

1. Field of the Invention

The present invention relates to an optical information recording medium with which information signals can be recorded and/or reproduced by irradiating a thin film formed on a substrate with a laser or other such high-energy light beam. The present invention further relates to a method for manufacturing such an optical information recording medium, and a method and apparatus for recording on this medium.

2. Background Information

Information recording, erasing and rewriting are performed with respect to a phase change type optical information recording medium by utilizing a phenomenon in which a recording material is changed in phase reversibly between a crystalline phase and an amorphous phase. When a thin film made of a chalcogen material or the like is formed on a substrate of the optical information recording medium, it is possible to switch between the amorphous phase and the crystalline phase by using different optical coefficients (refractive index n and extinction coefficient k) to vary the irradiation conditions of the localized heat produced by a laser beam. This is already common knowledge, and there have been a great deal of research and development and commercial application of so-called phase-changeable optical information recording media.

With a phase-changeable optical information recording medium, the laser output is modulated according to an information signal between at least two power levels (recording level and erasure level) in the irradiation of an information track, which makes it possible to erase existing signals while recording new signals at the same time.

With such an optical information recording medium, in addition to a recording layer, a protective layer composed of a dielectric material with excellent heat resistance, for example, is generally provided on the side of the recording layer closest to the substrate (lower side) and on the side opposite from the substrate (upper side). The functions of such protective layers include preventing thermal deformation of the substrate and evaporation of the recording layer in repeated recording, and enhancing chemical changes and the optical absorbance of the recording layer through an optical interference effect. Providing a reflective layer composed of a metal or alloy material is also standard practice. The functions of a reflective layer include allowing the efficient use of incident light, and raising the cooling rate so as to facilitate amorphitization.

Providing an interface layer between the recording layer and the dielectric layer has also been proposed. Functions of an interface layer include promoting crystallization of the recording layer to improve erasure characteristics, and preventing atomic and molecular inter-diffusion between the recording layer and the dielectric protective layer to improve durability in repeated recording. It is also favorable for the layer to offer good environmental reliability, so that there is no corrosion of or separation from the recording layer.

Providing a material layer between an upper dielectric layer and a reflective layer has also been proposed. The functions of a material layer include improving the erasure rate by adjusting the ratio of optical absorbance between when the recording layer is crystalline and when it is amorphous so that preventing distortion of the mark shape during overwriting, and increasing the C/N ratio by increasing the difference in reflectivity when the recording layer is crystalline and when it is amorphous. It is also preferable for the refractive index to be high and for the layer to absorb light suitably (see Japanese Unexamined Patent Publication No. 2000-215516A, for example).

The basic method for increasing the amount of information that can be stored on a single such optical information recording medium is either to shorten the wavelength of the laser light, or to increase the numerical aperture of the objective lens that condenses the light, thereby reducing the spot diameter of the laser beam and increasing recording surface density. The most popular approach in recent years, as typified by recordable DVDs, is to use an optical system with a wavelength of 660 nm and a numerical aperture (NA) of about 0.6. Furthermore, there have been studies into using blue laser diodes with a wavelength of around 400 nm, which have been nearing the practical stage, and further raising the numerical aperture to about 0.85. Using a numerical aperture this high results in a narrower acceptable margin with respect to the tilt of an optical disk, so it has also been proposed that the thickness of the transparent substrate on the side where the laser beam is incident be reduced from the 0.6 mm of a recordable DVD to about 0.1 mm.

Further, a multi-layer recording medium consisting of a plurality of layers for recording and reproducing information has also been proposed in an effort to increase the amount of information that can be handled with a single medium. With such a multi-layer recording medium, the information layer on the side closest to the laser beam source absorbs light, so recording and reproduction are performed with an attenuated laser beam in the information layer on the side farthest away from the laser beam source, which is a problem in that sensitivity decreases during recording and reflectivity and amplitude decreases during reproduction. Therefore, with a multi-layer recording medium, the information layer on the side closest to the laser beam source must have higher transmissivity, while the information layer on the side farthest away from the laser beam source must have higher reflectivity, reflectivity differential, and sensitivity, and adequate recording and reproduction characteristics must be obtained at limited laser power.

As mentioned above, raising the recording density is important with an optical information recording medium, but raising recording speed is also important in order to be able to handle a large volume of data in a short time. In order to accommodate high speed recording, the crystallization rate of the recording layer must be raised. The crystallization rate is highest with Ge—Sb—Te compositions, which are typical recording materials, and especially with compositions such as GeTe—$Sb_2Te_3$.

As discussed above, as new recording and reproduction devices are developed, the trend is for their recording speed to be higher, and media need to be able to keep up with these changes. At the same time, it must also be possible to record at low speed with the same medium in order to ensure compatibility with existing drivers capable only of recording at low speed. Also, from the standpoint of reducing the load on the motor, it is preferable to keep the medium rotating at a constant speed regardless of the radial position on the medium where information is being recorded. Since recording is performed at different linear velocities at the inner and outer tracks of the medium, however, it is necessary for recording on the medium to be possible at both high and low speeds, that is, at or over a specific linear velocity.

In order for a medium to accommodate high speed recording, it is necessary to use a recording layer with a high crystallization rate, as mentioned above. On the other hand, crystallization will be too fast if this recording layer is used for recording at low speed. That is, the problem is that it is difficult to form an amorphous phase and the large marks, so there is a decrease in signal amplitude.

In view of the above, it will be apparent to those skilled in the art from this disclosure that there exists a need for an improved optical information recording medium. This invention addresses this need in the art as well as other needs, which will become apparent to those skilled in the art from this disclosure.

SUMMARY OF THE INVENTION

It is an object of the present invention to provide a recording medium that yields good recording and reproduction characteristics over a wide range of linear velocity, as well as a method for manufacturing the medium and a method and apparatus for recording with the medium.

In view of the above object and other objects, an optical information recording medium of the present invention is provided with a transparent substrate and at least one recording layer disposed on the transparent substrate. The recording layer includes at least a first phase-changeable film and a second phase-changeable film in that order, starting on the side closest to the transparent substrate. The first phase-changeable film and the second phase-changeable film each contain at least 10 atom % and no more than 50 atom % germanium and at least 45 atom % and no more than 60 atom % tellurium, and at least one of the phase-changeable films contains bismuth.

Another optical information recording medium of the present invention is provided with a transparent substrate, with at least a first information layer, a separator layer, and a second information layer are provided on the transparent substrate in that order, starting on the side closest to the transparent substrate. The first information layer and/or the second information layer has at least a recording layer, the recording layer comprises at least a first phase-changeable film and a second phase-changeable film in that order, starting on the side closest to the transparent substrate. The first phase-changeable film and the second phase-changeable film each contain at least 10 atom % and no more than 50 atom % germanium and at least 45 atom % and no more than 60 atom % tellurium, and at least one of the phase-changeable films contains bismuth. This gives a recording medium having good recording and reproduction characteristics.

It is preferable if the difference in the bismuth content between the first phase-changeable film and the second phase-changeable film is at least 2 atom % or more. This makes it possible to accommodate a wider range of linear velocity.

The optical information recording medium of the present invention preferably comprises at least a recording layer and a reflective layer in that order, starting on the side closest to the transparent substrate.

It is preferable if there is an upper dielectric layer between the recording layer and the reflective layer.

It is preferable if there is also an upper interface layer between the recording layer and the upper dielectric layer.

It is preferable if the upper interface layer is composed of a material containing an oxide of at least one element selected from the group consisting of titanium, zirconium, hafnium, vanadium, niobium, tantalum, chromium, molybdenum, tungsten, gallium, and silicon. This gives a layer with excellent moisture resistance and erasure rate.

It is preferable if there is also a light absorbing layer between the upper dielectric layer and the reflective layer.

It is preferable if the light absorbing layer is composed of a material containing at least one element selected from the group consisting of silicon and germanium. This gives a good C/N ratio.

It is preferable if there is also a lower dielectric layer between the recording layer and the transparent substrate.

It is preferable if there is also a lower interface layer between the lower dielectric layer and the recording layer.

It is preferable if the lower interface layer is composed of a material containing an oxide of at least one element selected from the group consisting of titanium, zirconium, hafnium, vanadium, niobium, tantalum, chromium, molybdenum, tungsten, gallium, and silicon. This gives a layer with excellent moisture resistance and erasure rate.

The method of the present invention for manufacturing an optical information recording medium comprises forming a film on a transparent substrate such that a recording layer comprises at least a first phase-changeable film and a second phase-changeable film with the first phase-changeable film being disposed closer to the transparent substrate than the second phase-changeable film. The first phase-changeable film and the second phase-changeable film each contain at least 10 atom % and no more than 50 atom % germanium and at least 45 atom % and no more than 60 atom % tellurium, and either or both of the phase-changeable films contain bismuth.

Also, the method of the present invention for manufacturing an optical information recording medium comprises forming a film on a transparent substrate such that at least a first information layer, a separator layer, and a second information layer are provided on the transparent substrate in that order. The first information layer and/or the second information layer has at least a recording layer. The recording layer comprises at least a first phase-changeable film and a second phase-changeable film in that order with the first phase-changeable film being disposed closer to the transparent substrate than the second phase-changeable film. The first phase-changeable film and the second phase-changeable film each contain at least 10 atom % and no more than 50 atom % germanium and at least 45 atom % and no more than 60 atom % tellurium, and either or both of the phase-changeable films contain bismuth.

The present invention further provides a method and an apparatus for recording information on the above-mentioned medium.

The method of the present invention for recording information on an optical information recording medium having at least a recording layer on a transparent substrate, wherein the recording layer comprises at least a first phase-changeable film and a second phase-changeable film in that order, starting on the side closest to the transparent substrate, the first phase-changeable film and the second phase-changeable film each contain at least 10 atom % and no more than 50 atom % germanium and at least 45 atom % and no more than 60 atom % tellurium, either or both of the phase-changeable films contain bismuth, and comprising recording the information using a laser power modulated pulse waveform set such that the higher is the linear velocity of the medium while the medium is rotating, the higher is the quotient of dividing the time integral of the emission power by the maximum emission power.

The method of the present invention for recording information also involves a medium, the optical information recording medium having at least a recording layer on a transparent substrate, wherein at least a first information layer, a separator layer, and a second information layer are provided on the transparent substrate in that order, starting on the side closest to the transparent substrate, the first information layer and/or the second information layer has at least a recording layer, the recording layer comprises at least a first phase-changeable film and a second phase-changeable film in that order, starting on the side closest to the transparent substrate, the first phase-changeable film and the second phase-changeable film each contain at least 10 atom % and no more than 50 atom % germanium and at least 45 atom % and no more than 60 atom % tellurium, either or both of the phase-changeable films contain bismuth, and comprising recording the information using a laser power modulated pulse waveform set such that the higher is the linear velocity of the medium while the medium is rotating, the higher is the quotient of dividing the time integral of the emission power by the maximum emission power.

The apparatus of the present invention for recording information involves a medium, the optical information recording medium having at least a recording layer on a transparent substrate, wherein the recording layer comprises at least a first phase-changeable film and a second phase-changeable film in that order, starting on the side closest to the transparent substrate, the first phase-changeable film and the second phase-changeable film each contain at least 10 atom % and no more than 50 atom % germanium and at least 45 atom % and no more than 60 atom % tellurium, either or both of the phase-changeable films contain bismuth, and comprising recording the information using a laser power modulated pulse waveform set such that the higher is the linear velocity of the medium while the medium is rotating, the higher is the quotient of dividing the time integral of the emission power by the maximum emission power.

The apparatus of the present invention for recording information also involves a medium, the optical information recording medium having at least a recording layer on a transparent substrate, wherein at least a first information layer, a separator layer, and a second information layer are provided on the transparent substrate in that order, starting on the side closest to the transparent substrate, the first information layer and/or the second information layer has at least a recording layer, the recording layer comprises at least a first phase-changeable film and a second phase-changeable film in that order, starting on the side closest to the transparent substrate, the first phase-changeable film and the second phase-changeable film each contain at least 10 atom % and no more than 50 atom % germanium and at least 45 atom % and no more than 60 atom % tellurium, either or both of the phase-changeable films contain bismuth, and comprising recording the information using a laser power modulated pulse waveform set such that the higher is the linear velocity of the medium while the medium is rotating, the higher is the quotient of dividing the time integral of the emission power by the maximum emission power.

The recording method and recording apparatus of the present invention also encompass a recording and reproduction method in which information is reproduced either along with or before and after the recording of information, and a recording and reproduction apparatus equipped with an information reproduction mechanism along with a recording mechanism.

As described above, the present invention provides a recording medium that has high density yields good recording and reproduction characteristics over a wide range of linear velocity, as well as a method for manufacturing the medium and a method and apparatus for recording with the medium.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 4, an optical information recording medium is illustrated in partial cross sections in accordance with examples of the present invention.

Figure 1:
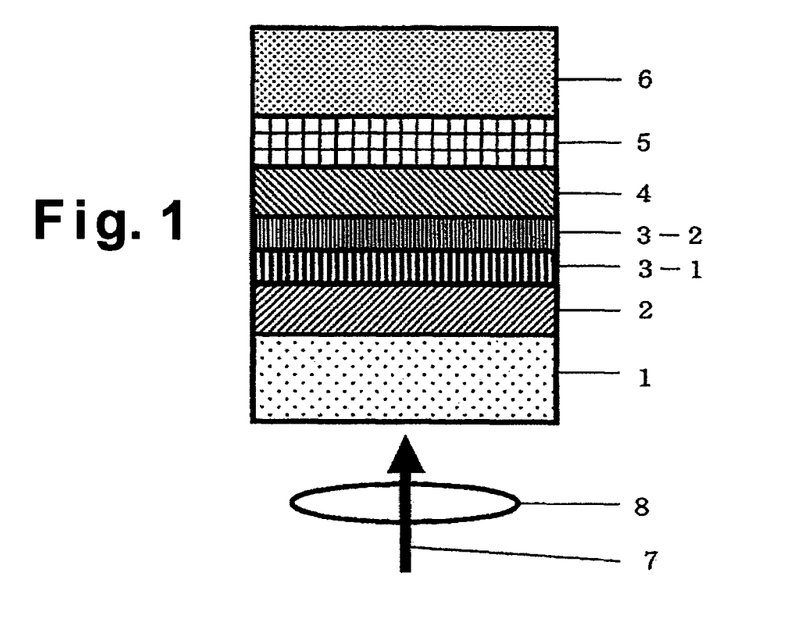
FIG. 1 is a partial cross sectional view of an optical information recording medium showing an example of a layer structure of the optical information recording medium in accordance with the present invention.

As shown in FIG. 1, the optical information recording medium of the present invention comprises, for example, a transparent substrate 1 provided with a lower dielectric layer 2, a recording layer 3 consisting of a first phase-changeable film 3-1 and a second phase-changeable film 3-2, an upper dielectric layer 4, a reflective layer 5, and a protective substrate 6 provided in that order over the transparent substrate 1. In the optical information recording medium of FIG. 1, the lower dielectric layer 2, the recording layer 3, the upper dielectric layer 4 and the reflective layer 5 constitutes an information layer. Recording and reproduction are performed with this optical information recording medium by irradiating the side of the recording layer 3 facing the transparent substrate 1 with a laser beam 7 condensed by an objective lens 8.

Figure 2:
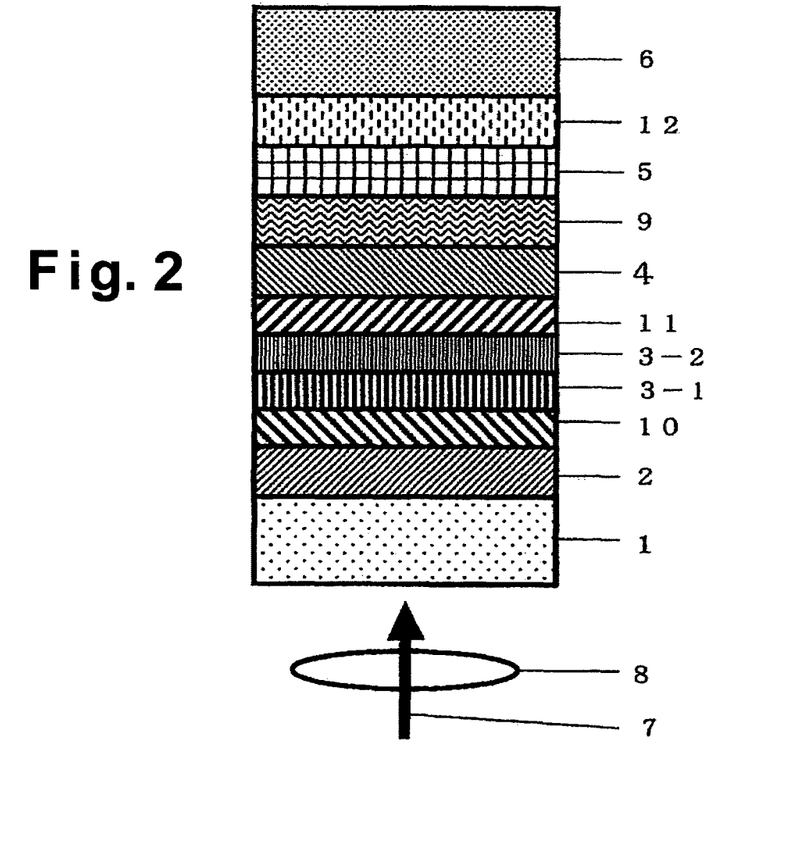
FIG. 2 is a partial cross sectional view of an optical information recording medium showing an example of a layer structure of the optical information recording medium in accordance with the present invention.

As shown in FIG. 2, if desired, a light absorbing layer 9 can be provided between the upper dielectric layer 4 and the reflective layer 5, a lower interface layer 10 can be provided between the lower dielectric layer 2 and the recording layer 3, an upper interface layer 11 can be provided between the recording layer 3 and the upper dielectric layer 4, and an uppermost dielectric layer 12 can be provided between the reflective layer 5 and the protective substrate 6. In the optical information recording medium of FIG. 2, the lower dielectric layer 2, the recording layer 3, the upper dielectric layer 4, the reflective layer 5, the light absorbing layer 9, the lower interface layer 10, the upper interface layer 11 and an uppermost dielectric layer 12 can be provided between constitutes an information layer.

Figure 3:
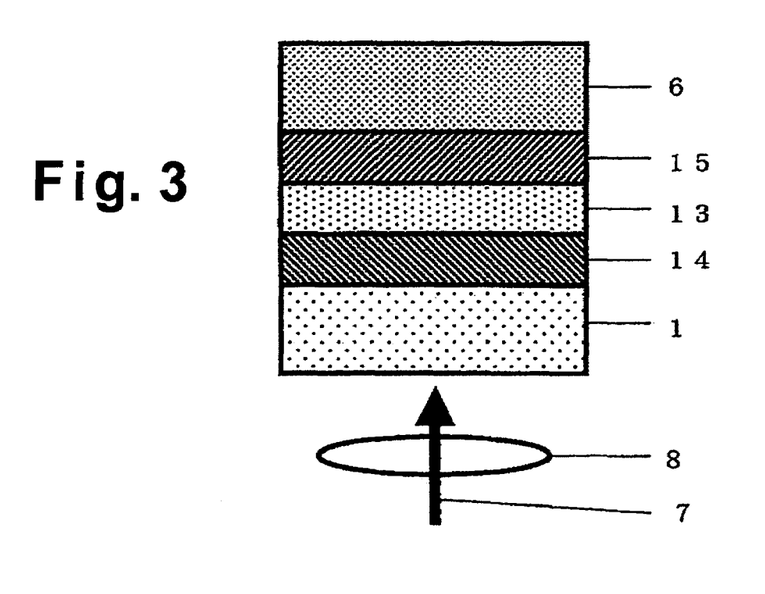
FIG. 3 is a partial cross sectional view of an optical information recording medium showing an example of a layer structure of the optical information recording medium in accordance with the present invention.
Figure 4:
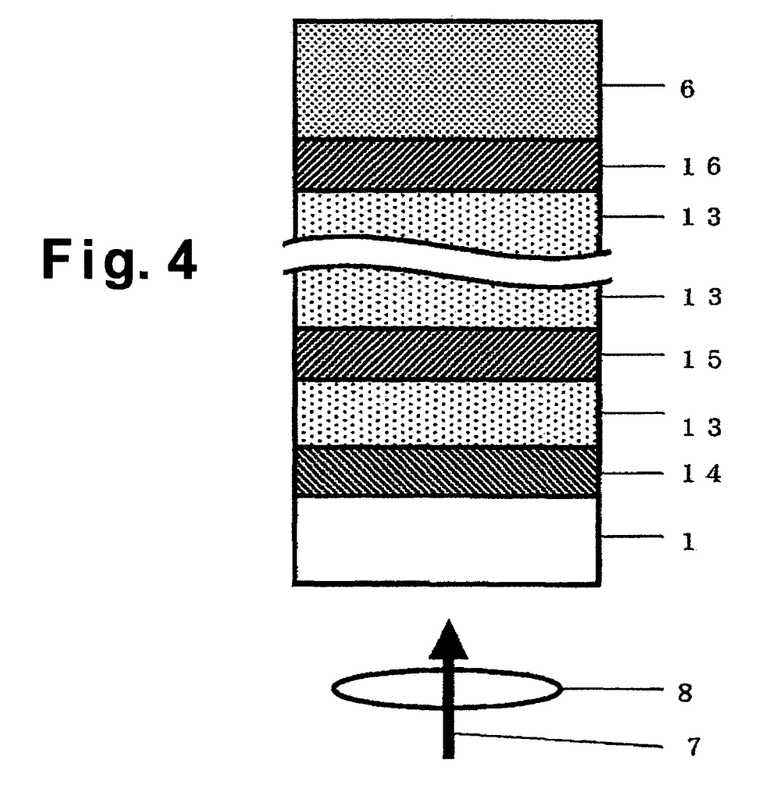
FIG. 4 is a partial cross sectional view of an optical information recording medium showing an example of a layer structure of the optical information recording medium in accordance with the present invention.

Also, as shown in FIGS. 3 and 4, the optical information recording medium of the present invention can be constituted such that a first information layer 14, a second information layer 15, and up to an n-th information layer 16 (where n is an integer of at least 3) can be provided between the transparent substrate 1 and the protective substrate 6, with a separator layer 13 interposed between each adjacent pairs of the information layers. All of the information layers here have the multi-layer thin-film structure shown in FIG. 1 or 2. Recording and reproduction are performed by irradiating each of the information layers of this optical information recording medium from the side that faces the transparent substrate 1 with the laser beam 7 condensed by the objective lens 8.

It is preferable for the material of the transparent substrate 1 to be substantially transparent at the wavelength of the laser beam 7. A polycarbonate resin, polymethyl methacrylate resin, polyolefin resin, norbornene resin, UV-curing resin, glass, or the like, or a suitable combination of these, can be used for this material. There are no particular restrictions on the thickness of the transparent substrate 1, but it can be about 0.01 to 1.5 mm.

Examples of the material of the lower dielectric layer 2 and the upper dielectric layer 4 include oxides of yttrium, cerium, titanium, zirconium, niobium, tantalum, cobalt, zinc, aluminum, silicon, germanium, tin, lead, antimony, bismuth, tellurium, or the like, nitrides of titanium, zirconium, niobium, tantalum, chromium, molybdenum, tungsten, boron, aluminum, gallium, indium, silicon, germanium, tin, lead, or the like, carbides of titanium, zirconium, niobium, tantalum, chromium, molybdenum, tungsten, silicon, or the like, selenides, tellurides, and sulfides of zinc, cadmium, or the like, fluorides of magnesium, calcium, lanthanum, or the like, elemental carbon, silicon, germanium or the like, and mixtures of these. Of these, it is particularly preferably to use a material that is substantially transparent and has a low coefficient of thermal conductivity, such as a mixture of ZnS and $SiO_2$. The lower dielectric layer 2 and the upper dielectric layer 4 can be of different materials and/or compositions as needed, or can be of the same material and composition. The thickness of the upper dielectric layer 4 is preferably at least 2 nm and no more than 80 nm, with at least 5 nm and no more than 50 nm being even better. If the upper dielectric layer 4 is too thin, the recording layer 3 and the reflective layer 5 will be too close together, then the cooling effect of the reflective layer 5 will be very strong, there will be more thermal diffusion from the recording layer 3, the recording sensitivity will decrease, and the recording layer 3 will also crystallize less readily. Conversely, if the upper dielectric layer 4 is too thick, then the recording layer 3 and the reflective layer 5 will be too far apart, the cooling effect of the reflective layer 5 will be weak, there will be less thermal diffusion from the recording layer 3, and the recording layer 3 will become amorphous less readily. There are no particular restrictions on the thickness of the lower dielectric layer 2, but at least 10 nm and no more than 200 nm is preferable.

Several of the materials listed above as examples for the lower dielectric layer 2 and the upper dielectric layer 4 can serve as the material of the lower interface layer 10 and the upper interface layer 11. For instance, nitrides based on germanium, silicon, or the like, oxides of titanium, zirconium, hafnium, vanadium, niobium, tantalum, chromium, molybdenum, tungsten, gallium, silicon, or the like, or compound oxides of these, can be used. Of these, a material based on an oxide of titanium, zirconium, hafnium, vanadium, niobium, tantalum, or the like, and to which an oxide of chromium, molybdenum, tungsten, gallium, or the like has been added will have superior moisture resistance, while erasure rate can be further improved by adding an oxide of silicon or the like. There are no particular restrictions on the thickness of the lower interface layer 10 and the upper interface layer 11. However, these layers 10 and 11 will have no effect as an interface layer if they are too thin. On the other hand, recording sensitivity will decrease, among other problems, if these layers 10 and 11 are too thick. Thus, a preferable range for these layers 10 and 11 is at least 0.2 µm and no more than 20 nm. The above-mentioned effect can be realized by providing just the lower interface layer 10 or the upper interface layer 11, but it is preferable to provide both. When both of these layers 10 and 11 are provided, they can be of different materials and/or compositions, or can be of the same material and composition.

The materials of the first phase-changeable film 3-1 and the second phase-changeable film 3-2 that constitute the recording layer 3 contain as essential components at least 10 atom % and no more than 50 atom % germanium and at least 45 atom % and no more than 60 atom % tellurium, and either just one of these films contains bismuth, or both contain bismuth, with the content thereof differing between the materials. The germanium content can be at least 20 atom % and no more than 50 atom %. Using a recording layer such as this allows the C/N ratio and the erasure rate to be kept high over a wide range of linear velocity. In addition to germanium, tellurium, and bismuth, one or more elements selected from among metal, semimetal, and semiconductor elements such as antimony, tin, indium, gallium, zinc, copper, silver, gold, and chromium, and non-metal elements such as oxygen, nitrogen, fluorine, carbon, sulfur, and boron can be contained as needed in an amount of no more than 20 atom %, and preferably no more than 10 atom %, and especially favorably no more than 5 atom %, of the entire first phase-changeable film 3-1 or the entire second phase-changeable film 3-2 for the purpose of adjusting the crystallization rate, thermal conductivity, optical coefficient, etc., or improving the durability, heat resistance, and environmental reliability, for example.

A satisfactory C/N ratio can be obtained if the total thickness of the recording layer 3 is at least 2 nm and no more than 20 nm. If the total thickness of the recording layer 3 is less than 2 nm, the reflectivity and change in reflectivity will be inadequate, so the C/N ratio will be low. However, if the thickness is over 20 nm, there will be more thin-film in-plane thermal diffusion in the recording layer 3, so the C/N ratio will end up being low in high density recording. The total thickness of the recording layer 3 is preferably at least 4 nm and no more than 14 nm. The desired effect will be obtained if the proportion of the total thickness of the recording layer 3 accounted for by both the first phase-changeable film 3-1 and the second phase-changeable film 3-2 is at least 5% and no more than 95%, and preferably at least 10% and no more than 90%, and even more preferably at least 20% and no more than 80%.

The light absorbing layer 9 is preferably made from a material that has a high refractive index and suitably absorbs light, that is, one with a refractive index n of at least 3 and no more than 6, and an extinction coefficient k of at least 1 and no more than 4, with n preferably being at least 3 and no more than 5 and k at least 1.5 and no more than 3, for the purposes of adjusting the ratio of optical absorbance between when the recording layer 3 is crystalline and when it is amorphous, improving the erasure rate by preventing distortion of the mark shape during overwriting, and increasing the difference in reflectivity when the recording layer is crystalline and when it is amorphous, so that the C/N ratio is greater, for example. More specifically, it is preferable to use an amorphous germanium alloy or silicon alloy, such as Ge—Cr, Ge—Mo, Si—Cr, Si—Mo, or Si—W, or a crystalline metal, semimetal, or semiconductor material, such as titanium, zirconium, niobium, tantalum, chromium, molybdenum, tungsten, SnTe, or PbTe. Of these, materials based on silicon are preferred because they have a higher melting point, and therefore better heat resistance, than germanium, and their thermal conductivity is also higher, so the C/N ratio is greater. Also, a nearly transparent material selected from those listed above as materials for the lower dielectric layer 2 and the upper dielectric layer 4 can be used as an additional interface layer, instead of the light absorbing layer 9, in order to prevent corrosion or admixture due to reaction between the upper dielectric layer 4 and the reflective layer 5.

The material of the reflective layer 5 can be, for example, gold, silver, copper, aluminum, nickel, chromium, or alloys based on these. Of these, aluminum alloys are particularly favorably in terms of cost, while silver alloys are preferable because of their high thermal conductivity and reflectivity. The reflective layer 5 can also consist of a plurality of layers used in combination.

A suitable material from among those listed above as materials for the lower dielectric layer 2 and the upper dielectric layer 4 is selected as the material for the uppermost dielectric layer 12. Particularly when the reflective layer 5 is thin (such as 20 nm or thinner) and semitransparent, it is preferable to use $TiO_2$, $Bi_2O_3$, or another such material with a high refractive index n because it results in a greater change in reflectivity or reflectivity contrast.

The materials and compositions of the various layers of the above-mentioned multi-layer thin film can be examined by Auger electron spectroscopy, X-ray photoelectron spectroscopy, secondary ion mass spectrometry, or another such method. It was confirmed in the embodiments in this application that the target material compositions of the various layers were substantially the same as the compositions of the thin films actually formed. However, depending on the film formation apparatus, film formation conditions, target manufacturing method, and so forth, the target material compositions can sometimes differ from the compositions of the thin films actually formed. In this event, it is preferable to determine a correction coefficient for correcting the compositional deviation ahead of time by experimentation, and decide on the target material compositions so as to obtain thin films of the desired composition.

Examples of the material of the protective substrate 6 are the same as those given for the material of the transparent substrate 1. However, the material need not be the same as that of the transparent substrate 1, and need not be transparent at the wavelength of the laser beam 7. There are no particular restrictions on the thickness of the protective substrate 6, but it can be about 0.01 to 3.0 mm.

A UV-setting resin or the like can be used as the separator layers 13. The thickness of the separator layers 13 is preferably at least the focal depth determined by the wavelength $\lambda$ of the laser beam 7 and the numerical aperture NA of the objective lens 8, so that there will be less crosstalk from either the first information layer 14 or the second information layer 15 when information from the other is being reproduced. The thickness of all of the information layers should fit within the range of possible focusing. For instance, the thickness of the separator layers 13 is preferably at least 10 μm and no more than 100 μm when $\lambda=660$ nm and NA=0.6, and at least 5 μm and no more than 50 μm when $\lambda=405$ nm and NA=0.85. If an optical system capable of reducing interlayer crosstalk were to be developed, it is conceivable that the separator layers 13 could be made thinner than above.

The first information layer 14 preferably has a transmissivity of at least 30%, but need not be a rewritable type, and can instead be an information layer of the write-once type or reproduction-only type.

The quantity of information that can be stored per medium can be doubled by employing a two-sided structure in which two of the above-mentioned optical information recording media are stuck together with their protective substrate 6 sides facing each other.

The various thin films mentioned above can be formed, for example, by vacuum vapor deposition, sputtering, ion plating, CVD (chemical vapor deposition), MBE (molecular beam epitaxy), or another such vapor phase thin film deposition method.

The above-mentioned thin film layers and the separator layers 13 can be successively formed on the transparent substrate 1, and the protective substrate 6 then formed or applied. Alternatively, the transparent substrate 1 can be formed or applied after these layers have been successively formed on the protective substrate 6. The latter is particularly favorable when the transparent substrate 1 is thin (0.4 mm or less). In this case, a pattern of pits and lands consisting of an address signal, a groove for guiding a laser beam, or the like must be formed on the surface of the protective substrate 6 and the separator layers 13, that is, transferred from a stamper or the like on which the desired pattern has already been formed. Here, if it would be difficult to produce the pattern by the injection method that is usually used, because of particularly low film thickness (such as the separator layers 13), then photopolymerization can be employed.

Since the recording layer 3 of the above-mentioned optical information recording medium is generally in an amorphous state right after being formed, it is subjected to initialization in which it is rendered crystalline by being annealed with a laser beam or the like, which results in a completed disk that is ready for recording and reproduction.

Figure 5:
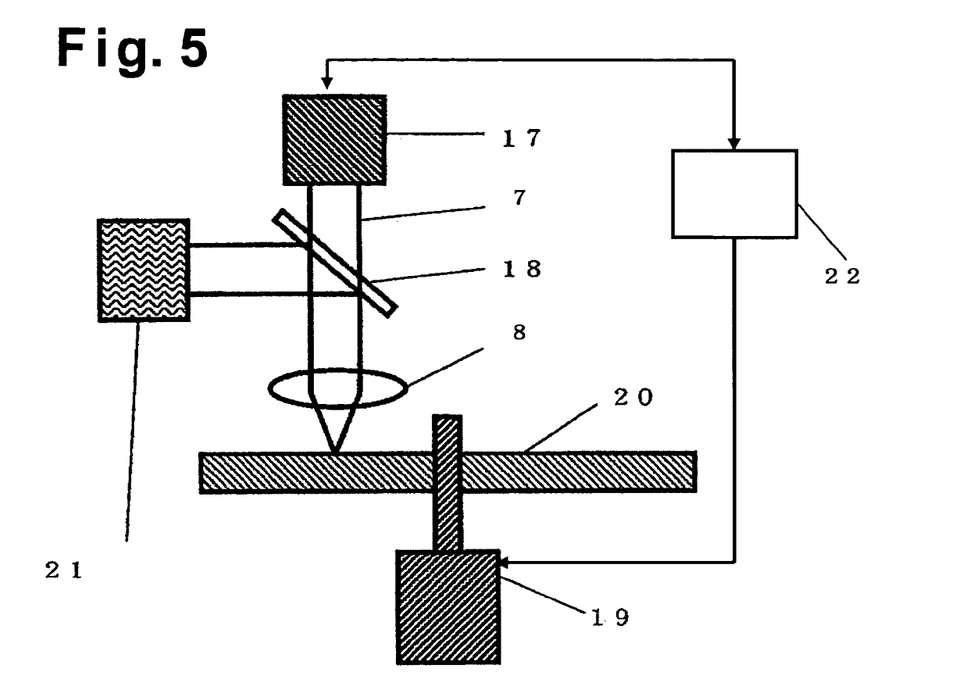
FIG. 5 is a simplified diagram of an example of an apparatus of the present invention for recording and reproduction with an optical information recording medium in accordance with the present invention.

FIG. 5 is a simplified diagram of an apparatus structured as a recording and reproduction device that performs recording and reproduction with an optical information recording medium, and is given as an example of the recording apparatus of the present invention. A laser beam 7 emitted by a laser diode 17 passes through a half mirror 18 and an objective lens 8, and is focused on an optical information recording medium (disk) 20 that is being rotated by a motor 19. The reproduction of information is performed by directing light reflected from the optical information recording medium 20 at a photodetector 21 and detecting the signal. A controller 22 is configured and arranged to control the laser diode 17 and the motor 19 to record and/or reproduce information on the optical information recording medium 20 in accordance with the present invention. The controller 22 preferably includes a microcomputer with a control program that controls the laser diode 17 and the motor 19 to record and/or reproduce information on the optical information recording medium 20. The controller 22 can also include other conventional components such as an input interface circuit, an output interface circuit, and storage devices such as a ROM (Read Only Memory) device and a RAM (Random Access Memory) device.

In the recording of an information signal, the intensity of the laser beam 7 is modulated between a several power levels. The laser beam intensity modulation device for modulating the laser intensity can be a current modulation device for modulating the drive current of a semiconductor laser, or can be a device such as an electro-optical modulator or an acousto-optical modulator. Simple square pulses of peak power P1 can be used for portions where recording marks are to be formed, but when particularly long marks are to be formed, a recording pulse train consisting of a train of a plurality of pulses modulated between the peak power P1 and the bottom power P3 (where P1>P3) is used for the purpose of eliminating excess heat and keeping the mark width uniform. A cooling period of cooling power P4 can also be provided after the trailing pulse. For those portions where no marks are to be formed, the power is held steady at a bias power P2 (where P1>P2).

Figure 6:
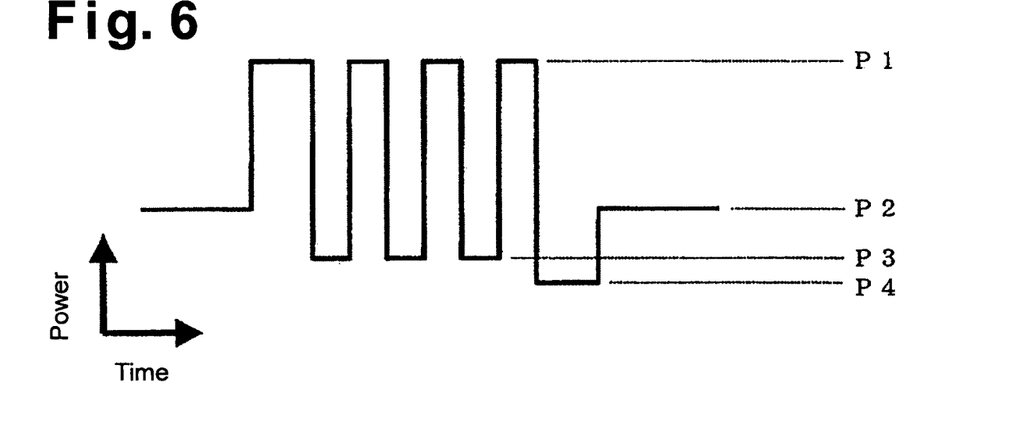
FIG. 6 is a simplified diagram of the recording waveform used in the recording and reproduction of the optical information recording medium in accordance with the present invention.

Good recording and reproduction characteristics can be maintained over a wider range of linear velocity by setting the laser power modulated pulse waveform such that the higher is the linear velocity, the higher is the quotient of dividing the time integral of the emission power by the maximum emission power. More specifically, increasing the quotient of dividing the time integral of the emission power by the maximum emission power means that, with the pulse waveform shown in FIG. 6, for example, either the width of some or all of each pulse of peak power P1 can be increased, or the power level P3 can be raised, which is particularly effective at increasing the erasure rate at a high linear velocity.

Depending on the various patterns here, such as the length of the marks being recorded or the length of the spaces before and after these marks, there can be some unevenness in the location of the mark edges, which can lead to an increase in jitter. To prevent this and reduce jitter, with the method of the present invention for recording with an optical information recording medium, the length of location of the various pulses in the above-mentioned pulse train can be adjusted and compensated as needed so that the edge locations will be uniform for each pattern.

With the present invention, two or more modes can be employed in the recording of information. Thus, the medium can be rotated at two or more different linear velocities corresponding to these two or more modes, with two or more different laser power modulated pulse waveforms used according to these two or more linear velocities. Also these two or more laser power modulated pulse waveforms can be set such that the higher is the above-mentioned linear velocity, the higher is the quotient of dividing the time integral of the emission power by the maximum emission power.

EXAMPLES

The present invention will now be described in more specific terms, but these examples are not intended to limit the present invention.

A substrate composed of a polycarbonate resin, with a diameter of 12 cm, a thickness of 0.6 mm, a groove pitch of 1.23 μm, and a groove depth of approximately 55 nm was readied as the transparent substrate 1. On the side of the transparent substrate where the grooves had been formed, the following layers were successively formed by sputtering: a lower dielectric layer with a thickness of 130 nm and composed of $(ZnS)_{80}(SiO_2)_{20}$; a lower interface layer with thickness of 5 nm and composed of $(ZrO_2)_{25}(SiO_2)_{25}(Cr_2O_3)_{50}$; a recording layer with a total thickness of 8 nm, produced by forming a first phase-changeable film with a thickness of 4 nm and a second phase-changeable film with a thickness of 4 nm and composed of various materials and compositions, in that order, starting on the side closest to the transparent substrate; an upper interface layer with a thickness of 5 nm and composed of $(ZrO_2)_{25}(SiO_2)_{25}(Cr_2O_3)_{50}$; an upper dielectric layer with a thickness of 35 nm and composed of $(ZnS)_{80}(SiO_2)_{20}$; a light absorbing layer with a thickness of 30 nm and composed of $CrSi_2$; and a reflective layer with a thickness of 80 nm and composed of $Ag_{98}Pd_1Cu_1$.

As shown in Table 1, the first phase-changeable film and the second phase-changeable film of the recording layer were made a material composed of all or some of germanium, antimony, bismuth, and tellurium, with the compositional ratios thereof varied.

TABLE 1

| Disk No. | | Compositional ratio of recording layer (atom %) | | | | 8.2 m/s | | 20.0 m/s | |
|---|---|---|---|---|---|---|---|---|---|
| | | Ge | Sb | Bi | Te | C/N ratio | Erasure rate | C/N ratio | Erasure rate |
| 0a | FIRST PHASE-CHANGEABLE FILM | 40 | 8 | 0 | 52 | ⊕ | ⊕ | ○ | X |
| | SECOND PHASE-CHANGEABLE FILM | | | | | | | | |
| 0b | FIRST PHASE-CHANGEABLE FILM | 40 | 0 | 8 | 52 | X | Δ | ⊕ | ⊕ |
| | SECOND PHASE-CHANGEABLE FILM | | | | | | | | |
| 0c | FIRST PHASE-CHANGEABLE FILM | 40 | 4 | 4 | 52 | Δ | ⊕ | ⊕ | Δ |
| | SECOND PHASE-CHANGEABLE FILM | | | | | | | | |
| 1x | FIRST PHASE-CHANGEABLE FILM | 40 | 2 | 6 | 52 | ○ | ⊕ | ⊕ | ⊕ |
| | SECOND PHASE-CHANGEABLE FILM | 40 | 6 | 2 | 52 | | | | |
| 1y | FIRST PHASE-CHANGEABLE FILM | 40 | 6 | 2 | 52 | ⊕ | ○ | ⊕ | ○ |
| | SECOND PHASE-CHANGEABLE FILM | 40 | 2 | 6 | 52 | | | | |
| 2x | FIRST PHASE-CHANGEABLE FILM | 40 | 0 | 8 | 52 | ⊕ | ⊕ | ⊕ | ⊕ |
| | SECOND PHASE-CHANGEABLE FILM | 40 | 8 | 0 | 52 | | | | |
| 2y | FIRST PHASE-CHANGEABLE FILM | 40 | 8 | 0 | 52 | ⊕ | ⊕ | ⊕ | ○ |
| | SECOND PHASE-CHANGEABLE FILM | 40 | 0 | 8 | 52 | | | | |
| 3x | FIRST PHASE-CHANGEABLE FILM | 30 | 0 | 16 | 54 | ○ | ⊕ | ⊕ | ⊕ |
| | SECOND PHASE-CHANGEABLE FILM | 30 | 16 | 0 | 54 | | | | |
| 4x | FIRST PHASE-CHANGEABLE FILM | 15 | 0 | 28 | 57 | ○ | ⊕ | ○ | ⊕ |

TABLE 1-continued

| | Compositional ratio of recording layer (atom %) | | | | | 8.2 m/s | | 20.0 m/s | |
|---|---|---|---|---|---|---|---|---|---|
| Disk No. | | Ge | Sb | Bi | Te | C/N ratio | Erasure rate | C/N ratio | Erasure rate |
| | SECOND PHASE-CHANGEABLE FILM | 15 | 28 | 0 | 57 | | | | |
| 5z | FIRST PHASE-CHANGEABLE FILM | 15 | 0 | 28 | 57 | ⊕ | ⊕ | ⊕ | ⊕ |
| | SECOND PHASE-CHANGEABLE FILM | 40 | 8 | 0 | 52 | | | | |

Key to symbols

| | C/N ratio | Erasure rate |
|---|---|---|
| ⊕ | at least 55 dB | at least 34 dB |
| ○ | at least 52 dB, less than 55 dB | at least 30 dB, less than 34 dB |
| Δ | at least 49 dB, less than 52 dB | at least 26 dB, less than 30 dB |
| X | less than 49 dB | less than 26 dB |

The recording layer was formed using a mixed gas of Ar—$N_2$ as the sputtering gas ($N_2$ partial pressure approximately 3%), while the other layers were formed using just argon as the sputtering gas.

A protective substrate composed of a polycarbonate was applied via a UV-setting resin to the multi-layer thin film surface thus formed, and this was cured by irradiation with UV light. This disk was annealed with a laser beam from the transparent substrate side to initialize the entire recording layer.

Each disk was rotated under two conditions: a linear velocity of 8.2 m/s (reference clock T=17.1 ns) and a linear velocity of 20.5 m/s (reference clock T=6.9 ns), and an optical system with a wavelength of 660 nm and a NA of 0.6 was used for measurement. At both linear velocities, 3T signals and 11T signals were alternately recorded eleven times at the grooves and lands, this track was reproduced in a state in which a 3T signal had been recorded, and the C/N ratio was measured with a spectrum analyzer. The erasure rate when an 11T signal had been recorded once, that is, the attenuation rate of the 3T signal amplitude, was measured with a spectrum analyzer.

The laser modulated waveform in the recording of the signals, at both linear velocities, was a simple square pulse with a width of 1.5T (power level P1) with the 3T signals, and was a pulse train composed of a leading pulse with a width of 1.5T and eight subsequent sub-pulses with a width of 0.5T (power level P1) with the 11T signals. The width between the pulses was 0.5T. Continuous light of power level P2 was used for the portions where no marks were to be recorded. P3=P2 at a linear velocity of 8.2 m/s, and P3=P2+1 mW at a linear velocity of 20.5 m/s. The various power levels were determined as follows. The recording power level P1 was 1.5 times the lower limit for power at which the C/N ratio exceeded 45 dB, the power level P2 was the median value in the power range at which the erasure rate exceeded 20 dB, and the reproduction power level P5 was 1.0 mW.

Table 1 shows the results of measuring the C/N ratio and the erasure rate of the various disks under the above conditions. The C/N ratio and the erasure rate did not vary greatly between the grooves and lands of each disk, but Table 1 shows the lower of the values.

The disks 0a, 0b, and 0c had recording layers in which the first phase-changeable film and the second phase-changeable film both had the same composition, and are comparative examples versus the disks of the working examples of the present invention. A high C/N ratio and an erasure rate were obtained with disk 0a when the recording was performed at low speed, but the crystallization rate was too low at high speed, so the erasure rate was low. Conversely, a high C/N ratio and an erasure rate were obtained with disk 0b when the recording was performed at high speed, but the crystallization rate was too high at low speed, so the C/N ratio was low. With the disk 0c, the crystallization rate was somewhat too high when the recording was performed at low speed, so a satisfactory C/N ratio was not obtained, but when the recording was performed at high speed, the crystallization rate was too low, so the erasure rate was unsatisfactory. Thus, although the crystallization rate can be adjusted by varying the bismuth content, it can be seen that there is a limit to the applicable linear velocity range.

In contrast, with the other disks, which were working examples of the information, a satisfactory C/N ratio was obtained even at low speed, the erasure rate was high at high speed, and good recording characteristics were exhibited from low to high speed. In particular, the disks 2x and 2y exhibited recording characteristics superior to those of the disks 1x and 1y, indicating that a wider range of linear velocity can be accommodated when there is a greater difference in the bismuth content between the first phase-changeable film and the second phase-changeable film. A wide range of linear velocity could be accommodated regardless of whether the bismuth content was higher in the first phase-changeable film or the second phase-changeable film, but the C/N ratio is higher and the erasure rate is lower with the disk 1y than with the disk 1x, and with the disk 2y than with the disk 2x, so it can be seen that the first phase-changeable film has more of an effect on crystallization, while the second phase-changeable film has more of an effect on amorphitization. Also, the greater is the bismuth content and the lower is the germanium content of the disk 3x and the disk 4x versus the disk 2x, the better is the C/N ratio, but it still tends to be somewhat low. This is because there is a decrease in optical contrast between the crystalline phase and the amorphous phase, and while there is no decrease in the range of linear velocity that can be accommodated in terms of thermal properties, raising the bismuth content too high is impractical from an optical standpoint. In contrast, the disk 5z had the same high bismuth content in its first phase-changeable film as the disk 4x, which helps to lower the C/N ratio, and as a result good C/N ratio and erasure rate can be obtained at both low and high speed. Thus, the present invention can be worked as long as the difference in the bismuth content between the first phase-changeable film and the second phase-changeable film is at least 2 atom %, but a difference of at least 4 atom % is preferred, and at least 8 atom % is even better.

In this example, the thickness of the first phase-changeable film was the same as that of the second phase-changeable film, but when the ratio of film thickness is varied without changing the overall thickness, the balance between the two changes, so there is a change in crystallization rate, but the balance can be restored by correspondingly changing the bismuth content.

The above results tell us that good recording and reproduction characteristics can be obtained over a wide range of linear velocity by using a recording layer that combines phase-changeable films with different bismuth contents.

The optical information recording medium of the present invention is useful as a medium for storing data that can be digitized, such as video, music, and information.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the scope of the present invention. Thus, the scope of the invention is not limited to the disclosed embodiments.

What is claimed is:

1. An optical information recording medium comprising:
   a transparent substrate; and
   at least one recording layer disposed on the transparent substrate,
   the recording layer including at least a first phase-changeable film and a second phase-changeable film, with the first phase-changeable film being disposed closer to the transparent substrate than the second phase-changeable film, and the first phase-changeable film and the second phase-changeable film being in contact with each other,
   each of the first phase-changeable film and the second phase-changeable film containing at least 10 atom % and no more than 50 atom % germanium and at least 45 atom % and no more than 60 atom % tellurium, wherein either (1) only one of the first and second phase-changeable films contains bismuth, or (2) each of the first and second phase-changeable films contains bismuth such that an amount of bismuth contained in the first phase-changeable film is different from an amount of bismuth contained in the second phase-changeable film.

2. An optical information recording medium comprising:
   a transparent substrate;
   at least first and second information layers disposed on the transparent substrate; and
   a separator layer disposed between the first and second information layers with the first information layer being provided closer to the transparent substrate than the second information layer;
   at least one of the first information layer and the second information layer has at least a recording layer,
   the recording layer including at least a first phase-changeable film and a second phase-changeable film, with the first phase-changeable film being disposed closer to the transparent substrate than the second phase-changeable film, and the first phase-changeable film and the second phase-changeable film being in contact with each other,
   each of the first phase-changeable film and the second phase-changeable film containing at least 10 atom % and no more than 50 atom % germanium and at least 45 atom % and no more than 60 atom % tellurium, wherein either (1) only one of the first and second phase-changeable films contains bismuth, or (2) each of the first and second phase-changeable films contains bismuth such that an amount of bismuth contained in the first phase-changeable film is different from an amount of bismuth contained in the second phase-changeable film.

3. The optical information recording medium according to claim 1, wherein
   a difference in the amount of bismuth contained in the first phase-changeable film and the amount of bismuth contained in the second phase-changeable film is at least 2 atom % or more.

4. The optical information recording medium according to claim 1, further comprising:
   at least a reflective layer, with the recording layer disposed closer to the transparent substrate than the reflective layer.

5. The optical information recording medium according to claim 4, further comprising:
   an upper dielectric layer disposed between the recording layer and the reflective layer.

6. The optical information recording medium according to claim 5, further comprising:
   an upper interface layer disposed between the recording layer and the upper dielectric layer.

7. The optical information recording medium according to claim 6, wherein
   the upper interface layer includes a material containing an oxide of at least one element selected from a group consisting of titanium, zirconium, hafnium, vanadium, niobium, tantalum, chromium, molybdenum, tungsten, gallium, and silicon.

8. The optical information recording medium according to claim 5, further comprising:
   a light absorbing layer disposed between the upper dielectric layer and the reflective layer.

9. The optical information recording medium according to claim 8, wherein
   the light absorbing layer includes a material containing at least one element selected from a group consisting of silicon and germanium.

10. The optical information recording medium according to claim 1, further comprising
    a lower dielectric layer between the recording layer and the transparent substrate.

11. The optical information recording medium according to claim 10, further comprising:
    a lower interface layer disposed between the lower dielectric layer and the recording layer.

12. The optical information recording medium according to claim 11, wherein
    the lower interface layer includes a material containing an oxide of at least one element selected from a group consisting of titanium, zirconium, hafnium, vanadium, niobium, tantalum, chromium, molybdenum, tungsten, gallium, and silicon.

13. A method for manufacturing an optical information recording medium, the method comprising:
    providing a transparent substrate; and
    forming at least one recording layer on the transparent substrate with the recording layer comprising at least a first phase-changeable film and a second phase-changeable film, with the first phase-changeable film being disposed closer to the transparent substrate than the second phase-changeable film, and the first phase-changeable film and the second phase-changeable film being in contact with each other,
    each of the first phase-changeable film and the second phase-changeable film containing at least 10 atom % and no more than 50 atom % germanium and at least 45 atom % and no more than 60 atom % tellurium, wherein either (1) only one of the first and second phase-changeable films contains bismuth, or (2) each of the first and second phase-changeable films contains bismuth such that an amount of bismuth contained in the first phase-changeable film is different from an amount of bismuth contained in the second phase-changeable film.

14. A method for manufacturing an optical information recording medium, the method comprising:

providing a transparent substrate;

forming at least a first information layer, a separator layer, and a second information layer on the transparent substrate in the order recited; and forming at least one of the first information layer and the second information layer with at least a recording layer;

the recording layer comprising at least a first phase-changeable film and a second phase-changeable film, with the first phase-changeable film being disposed closer to the transparent substrate than the second phase-changeable film, and the first phase-changeable film and the second phase-changeable film being in contact with each other, each of the first phase-changeable film and the second phase-changeable film containing at least 10 atom % and no more than 50 atom % germanium and at least 45 atom % and no more than 60 atom % tellurium, wherein either (1) only one of the first and second phase-changeable films contains bismuth, or (2) each of the first and second phase-changeable films contains bismuth such that an amount of bismuth contained in the first phase-changeable film is different from an amount of bismuth contained in the second phase-changeable film.

* * * * *